United States Patent [19]
LeSuer

[11] 3,779,922

[45] Dec. 18, 1973

[54] BARIUM-CONTAINING DISPERSIONS AND PROCESS

[75] Inventor: William M. LeSuer, Cleveland, Ohio

[73] Assignee: The Lubrizol Corporation, Wickliffe, Ohio

[22] Filed: June 19, 1972

[21] Appl. No.: 264,095

Related U.S. Application Data

[60] Continuation-in-part of Ser. No. 118,489, Feb. 24, 1971, abandoned, which is a continuation-in-part of Ser. No. 864,894, Oct. 8, 1969, abandoned, Continuation-in-part of Ser. No. 681,028, Nov. 6, 1967, Pat. No. 3,515,669, said Ser. No. 118,489, is a continuation of Ser. No. 64,632, Aug. 17, 1970, abandoned, which is a division of Ser. No. 864,894, Oct. 8, 1969, abandoned.

[52] U.S. Cl......................... 252/34.7, 44/51, 44/63, 252/18, 252/25, 252/33.6, 252/34, 252/40.7, 252/51.5 A
[51] Int. Cl......................... C10m 1/32, C10m 3/26
[58] Field of Search.................... 252/18, 25, 33.6, 252/34, 49.7, 51.5 A, 34.7, 40.7; 44/51, 5.7, 63

[56] References Cited
UNITED STATES PATENTS

| | | | |
|---|---|---|---|
| 2,695,910 | 11/1954 | Asseff et al. | 44/68 X |
| 2,777,874 | 1/1957 | Asseff et al. | 260/504 |
| 3,451,931 | 6/1969 | Kahn et al. | 44/51 X |

*Primary Examiner*—Patrick P. Garvin
*Assistant Examiner*—Andrew H. Metz
*Attorney*—Roger Y. K. Hsu et al.

[57] ABSTRACT

Process for preparing barium-containing dispersions in essentially inert diluents by contacting a basically reacting barium compound with carbon dioxide in the presence of a stabilizing agent and promoter. A typical process comprises carbonating a mixture of barium hydroxide monohydrate, heptyl phenol, and the reaction product of polyisobutenyl-substituted-succinic anhydride and an alkylene polyamine. The barium-containing dispersions thus produced are useful as additives for fuels and lubricants.

3 Claims, No Drawings

BARIUM-CONTAINING DISPERSIONS AND PROCESS

This is a continuation-in-part of copending application Ser. No. 118,489 filed Feb. 24, 1971, now abandoned, which, in turn, is a continuation-in-part application of Ser. No. 864,894 filed Oct. 8, 1969 and now abandoned. Ser. No. 864,894 is a continuation-in-part of Ser. No. 681,028 filed Nov. 6, 1967, now U.S. Pat. 3,515,669. Ser. No. 118,489 is also a continuation of now abandoned application Ser. No. 64,632 filed Aug. 17, 1970 which, in turn, is a division of application Ser. No. 864,894 indentified above.

This invention relates to a novel process for solubilizing or dispersing barium metal compounds in liquid media. Particularly, the invention relates to a process for preparing stable dispersions of basic metal compounds in an organic liquid medium. The novel compositions produced by the process as well as lubricants and fuels containing these compositions also form part of the present inventive concept.

It is well-known that stable dispersions of barium-containing compositions are used extensively as detergents and corrosion inhibitors in lubricating compositions, particularly as additives for internal combustion engine lubricants. These solutions have also been found useful as petroleum-distillate fuel additives. For example, the presence of a basic metal in a diesel fuel inhibits the formation of black exhaust smoke upon combustion of the fuel in operating diesel engines. Basic metal-containing compositions and uses therefore are described, for example, in U.S. Pat. Nos. 2,616,905; 2,723,234; 2,777,874; 2,781,403; 3,031,284; 3,256,186; 3,312,618; and 3,342,733. The use of basic metal-containing compositions as smoke suppressants in diesel fuels is discloseed in German Auslegeschrift 1,243,914.

The barium-containing dispersions produced by the process of the present invention particularly useful as additives for lubricating compositions. For example, the products function effectively as dispersants and detergents in lubricating oil compositions for internal combustion engines. However, like the above-described metal containing products of the prior art, they are also useful as anti-screenclogging agents in petroleum distillate fuels, e.g., gasoline, kerosene, fuel oils, etc., and smoke supressants in diesel fuels.

In accord with the foregoing, it is a principal of this invention to provide a process for incorporating barium compounds into organic liquid media.

Another object is to provide a process for preparing stable barium-containing dispersions particularly useful as additives for fuels and lubricants.

A further object is to provide novel barium-containing compositions.

An additional object is to provide lubricant and fuel compositions containing dispersed metal compounds therein.

These and other objects of the invention can be achieved by the process comprising the steps of contacting a carbon dioxide with at least one basically reacting barium compound in the presence of (A) at least one promotor selected from the class consisting of phenols and (B) at least one stabilizing agent selected from the class consisting of the amides, imides, and amidine derivatives of substituted succinic acids wherein the acids are characterized by a substantially saturated hydrocarbon portion having at least about fifty aliphatic carbon atoms. The process is normally conducted in the presence of a substantially inert, essentially nonpolar organic liquid diluent. The novel compositions produced by this process can then be incorporated in fuels and lubricants to provide the lubricant and fuel compositions contemplated by this invention.

While gaseous carbon dioxide is preferred for use in the process of this invention, other materials capable of producing carbon dioxide in situ may also be used. For example, urea, carbamates, and ammonium carbonates can be employed since they produce $CO_2$ in situ under the conditions of the process.

Promoters useful according to the present process are the phenols. The phenolic promoters include a variety of alkylated hydroxy-substituted benzene and napthalenes. A particularly useful class of phenols are the mono- and dialkylated phenols in which each alkyl substituent contains from about six to about two hundred carbon atoms, and preferably from six to twenty carbon atoms. Illustrative phenolic promoters are the heptylphenols, octylphenols, dodecylphenols, nonylphenols, polypropylene (M.W. of 150)-substituted phenol, polyisobutene (M.W. of 1200)-substituted phenols, cyclohexylphenols and behenylphenols.

Basically reacting barium compounds can be sulfides, hydrosulfides, amides, or alcoholates derived from alcohols having from about one to about thirty carbon atoms. However, the preferred barium compounds are the oxides, hydroxides, and lower alkoxides, the latter being derived from lower alkanols containing up to about seven carbon atoms. Specific basically reacting metal compounds include barium oxide, barium hydroxide, barium hydroxide monohydrate, barium methoxide, barium ethoxide, barium isopropoxide, and the like.

The substituents from the substituted succinic acids from which the stabilizing agents are derived is a substantially saturated aliphatic hydrocarbon radical having at least about fifty aliphatic carbon atoms. The substituent may contain pendant aryl groups or substantially inert polar groups. However, the polar groups should not be present in sufficiently large numbers to alter the substantially hydrocarbon character of the substituent. Exemplary polar groups include halo, carbonyl, oxy(-O-(, formyl, nitro, thio(-S-) etc. The upper limit on the number of polar groups is about 10 percent by weight based on the total weight of the hydrocarbon portion of the substituent. The hydrocarbon substituent should contain no more than about 5 percent olefinic linkages based on the total number of carbon-to-carbon covalent linkages present in the substituent. Preferably, the number of olefinic linkages will not exceed about 2 percent of the total convalent linkages.

The source of the hydrocarbon substituent on the substituted succinic acid includes principally the high molecular weight substantially saturated petroleum fractions and substantially saturated olefin polymers, particularly polymers of monoolefins having from two to thirty carbon atoms. The especially useful polymers are the polymers of 1-monoolefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-butene, and 4-octene. The preferred substituent is derived from polymerized isobutylene or propene.

Also useful are the interpolymers of the foregoing olefins with each other and/or with other interpolymerizable olefinic substances such as aromatic olefins, cyclic olefins, polyolefins. Such interpolymers include, for example, those prepared by polymerizing isobutene with styrene; isobutene with butadiene; propene with isopropene; ethylene with piperylene; isobutene with chloroprene; isobutene with P-methylstyrene; 1-hexene with 1,3-hexadiene; 1-octene with 1-hexene; 1-heptene with 1-pentene; 3-methyl-1-butene with 1-octene; 3,3-dimethyl-1-penetene with 1-hexene; isobutene with styrene and piperylene; etc.

The relative proportions of the monoolefins to the other monomers in the interpolymers influence the stability and oil-solubility of the final products derived from such interpolymers. Thus, for reasons of oil-solubility and stability and the interpolymers contemplated for use in this invention should be substantially aliphatic and substantially saturated, i.e., they should contain at least about 80 percent, preferably at least about 95 percent, on a weight basis, of units derived from aliphatic monoolefins.

Specific examples of such interpolymers include the copolymer of 95 percent of isobutene and 5 percent of styrene; the terpolymer of 98 percent of isobutene with 1 percent of piperylene and 1 percent of chloroprene; the terpolymer of 95 percent of isobutene with 2 percent of 1-butene and 3 percent of 1-hexene; the terpolymer of 80 percent of isobutene with 10 percent of 1-pentene and 10 percent of 1-octene; the copolymer of 80 percent of 1-hexene and 20 percent of 1-heptene; the terpolymer of 90 percent of isobutene with 2 percent of cyclohexene and 8 percent of propene; and the copolymer of 80 percent of ethylene and 20 percent of propene. The percentages refer to the percent by weight of total interpolymer weight.

Another source of hydrocarbon substituents are saturated aliphatic hydrocarbons, e.g., highly refined high molecular weight white oils or synthetic alkanes such as are obtained by hydrogenation of the high molecular weight olefin polymers illustrated above or other high molecular weight olefinic substances.

Olefin polymer having molecular weights from about 700 to about 10,000 are the preferred source of the substituent with those having molecular weights of about 700 to 5,000 being especially preferred.

The stabilizing agents are the amides, imides, and amidines derived from the above-described substituted succinic acids, carboxylic acids and the appropriate amines. As mentioned before, acid-producing equivalents such as anhydrides, halides, lower alkyl esters, and the like can be used in lieu of the substituted succinic acid per se in preparing these stabilizing agents. The substituted succinic acids and acid-producing compounds necessary for preparing the stabilizing agents are known in the prior art. The stabilizing agents themselves are also known or can be prepared through conventional processes.

Substituted succinic acid producing compounds are readily prepared by reacting maleic anhydride with a suitable olefin polymer of chlorinated hydrocarbon of the types described hereinabove. The reaction involves merely heating the two reactants at a temperature of about 100°C. to 200°C. The product of such a reaction is a succinic anhydride having a large hydrocarbon substituent. The hydrocarbon substituent may contain olefinic linkages. These may be converted, if desired, to saturated paraffinic linkages by hydrogenation. The anhydride may be hydrolyzed by treatment with water or steam to the corresponding acid and the acid converted to the corresponding halide. It will be noted in this regard that the anhydride is equivalent to the acids and the acid halides insofar as their utility in the preparation of the dispersants of this invention. In fact, the anhydride is often more reactive then the acid and is often preferred.

In lieu of the olefins or chlorinated hydrocarbons, other hydrocarbons containing an activating polar substituent, i.e., a substituent which is capable of activating the hydrocarbon molecule in respect to reaction with maleic acid or maleic anhydride, may be used in the above-illustrated reaction for preparing the substituted succinic acids. Such polar substituents are exemplified by sulfide, disulfide, nitro, mercaptan, halo, carbonyl, or formyl radicals. Examples of such polar-substituted hydrocarbons include polypropene sulfide, dipolyisbutene disulfide, nitrated mineral oil, dipolyethylene sulfide, brominated polyethylene, etc. Another useful method for preparing succinic acids and anhydrides involves the reaction of itaconic acid with a high molecular weight olefin or a polar-substituted hydrocarbon at a temperature usually within the range of from about 100°C.–200°C.

The stabilizing agents prepared from the reaction of polyolefin-substituted succinic acid or anhydride and mono- or polyamines, particularly polyalkylene polyamines having up to about ten amino nitrogens, are especially suitable, the reaction products generally comprise a mixture of amides, imides, and/or amidines. The reaction products of polyisobutene-substituted succinic anhydride and polyethylene polyamines containing up to about ten amino nitrogens are excellent stabilizing agents. These anhydride-mine products are disclosed in Pat. Nos. 3,018,250; 3,024,195; 3,172,892; 3,216,936; 3,219,666; and 3,272,746.

The foregoing patents are incorporated herein by reference for their disclosure of (1) the requisite acids or acids producing compounds such as acid halides, acid anhydrides, and the like useful in producing the stabilizing agents, (2) processes for preparing amides, imides, and amidines from these acid producing compounds, and (3) actual examples of suitable amides, etc., which can be satisfactorily employed as stabilizing agents in the present invention.

A convenient method for preparing the acylated nitrogen stabilizing agents from substitued succinic acid or acid-producing compounds comprises reacting the acid or an acid-producing compound with at least about one-half an equivalent of a nitrogen-containing compound characterized by the presence within its structure of at least one group of the formula

The above-process is generally carried out by heating a mixture of the succinic acid-producing and nitrogen-containing reactants at a temperature above about 80°C., preferably within the range of about 100°C. to about 250°C. The use of a solvent such as benzene, toluene, naphtha, mineral oil, xylene, n-hexane, or the like often desirable in the above process to facilitate the control of the reaction temperature.

The relative ratio of the succinic acid-producing compounds to the nitrogen-containing reactants in the above process are such that at least about one-half of a stoichiometrically equivalent amount of a nitrogen-containing reactant is used for each equivalent of the acid-producing compound. It should be noted that the equivalent weight of the nitrogen-containing reactant is based upon the number of the nitrogen-containing radicals,

Thus, ethylene-diamine has two equivalents per mole; amino guanidine has four equivalents per mole; and a substituted succinic acid or acid-producing compound has two equivalents per mole.

The upper limit of the useful amount of the nitrogen-containing reactant appears to be about two moles for each equivalent of the acid-producing compound. Such amount is required, for instance, in the formation of products having predominantly amidine linkages. Beyond this limit, the excess amount of a nitrogen-containing reactant appears not to take part in the reaction and thus simply remains in the product apparently without any adverse effect. On the other hand, the lower limit of about one-half equivalent of a nitrogen-containing reactant used for each equivalent of the acid producing compound is based upon the stoichiometry for the formation of products having predominantly imide linkages. In most instances, the preferred amount of the nitrogen-containing reactant is approximately one equivalent for each equivalent of the acid-producing reactant.

The process of the present invention is normally conducted in the presence of a substantially inert, essentially nonpolar organic liquid diluent. Since the resulting products are particularly useful as additives for lubricating oil and fuel compositions, the diluent normally will be a liquid which is soluble in lubricating oils and fuels. For this reason, the diluent usually comprises a lubricating oil such as a synthetic lubricating oil or a mineral lubricating oil. However, other organic diluents can also be employed, either along or in combination with each other or in combination with lubricating oil diluents. Suitable solvents include dialkyl ketones, alkyl aryl ketones, e.g., dipropyl ketone, methyl butyl ketone, acetophenone, and ethers such as n-propylether, n-amylether, and isoamylether.

Particularly useful diluents include the aliphatic and aromatic hydrocarbons and halohydrocarbons such as benzene, toluene, xylene, chlorobenzene; lower boiling petroleum distillates such as kerosene and the various naphthas, the normally liquid aliphatic hydrocarbons and halohydrocarbons such as hexane, heptane, hexane, chlorohexane, cyclopentane, cyclohexane, ethyl cyclohexane, and the like. These diluents which serve as the reaction medium are used alone or in combination with mineral oil or other natural or synthetic oils. When a combination of oil in one or more of the other solvents is used, the weight ratio of oil to the other solvent is generally 1:20 to 20:1. It is usually desirable for the lubricating oil to comprise at least about 50 percent by weight of the weight of diluent, especially if the product is to be used as a lubricant additive.

Upon completion of the present process, solids are removed from the reaction mass by filtration or other conventional means, and the resulting reaction product, including the inert diluent, can be added directly to the lubricating oil or fuel composition in which it is to be employed. Optionally, readily removable diluents can be removed by conventional techniques such as distillation prior to incorporating the reaction mixture into the lubricant or fuel composition. As is apparent to those skilled in the art, the amount of diluent employed can be increased or decreased during formation of the dispersions or before adding to the fuel or lubricant to facilitate mixing, temperature control, or to meet some other particular requirement related to the ultimate use of the composition.

It is obvious that it may be desirable to use reflux conditions to retain diluent and/or promotor having a boiling point that is lower than that of the reaction temperature. The need for such conditions depends on the particular promoters and diluents, the amount of each present, the reaction temperature, the duration of the reaction, and the amount of metal to be dispersed in the reaction product.

The invention encompasses bringing the various reactants together in any order. However, the procedure found to produce the best overall results comprises forming an initial reaction mixture made up of at least one each of a basically reacting barium compound, phenolic promoter, stabilizing agent, and the diluent. The carbon dioxide is then introduced into this initial mixture. During the course of the reaction, the carbon dioxide and the basically reacting barium compound react to form a metal-containing reaction product which is dispersed in the reaction medium. The stabilizing agent prevents the metal-containing reaction product from precipitating, i.e., it "stabilizes" the dispersion.

This indicated order or reaction can be varied to produce the best results with given reactants under given conditions. Thus, the basically reacting barium compound can be added in increments during the introduction of the acidic material. Moreover, additional stabilizing agent and/or diluent can be added during or after the process. The determination of an optimum order of reaction for given conditions is a matter of routine experimentation.

The basically reacting barium compound and the stabilizing agent normally are employed in amounts such that the ratio of equivalents of stabilizing agent to equivalents of barium is about 1:0.1 to about 1:30 and preferably 1:0.5 to about 1:12. For purposes of determining this ratio, the number of equivalents in a stabilizing agent is the number of carboxylic acid functions present. For example, a polyisobutenyl substituted succinic amide or imide contains two carboxylic functions. Thus, it has two equivalents per molecule. Barium has two equivalents per mole of basically reacting metal compound.

The amount of carbon dioxide employed depends upon the amount of metal to be dispersed in the reaction mixture. Theoretically, the ratio of equivalents of carbon dioxide to equivalents of barium to be dispersed is 1:1. However, as a practical matter, utilization of the carbon dioxide is not very efficient. Accordingly, the ratio of equivalents of carbon dioxide to equivalents of metal to be dispersed ranges from the stoichiometric ratio of about 1:1 to a large excess, for example, about 10:1.

From the foregoing, it is apparent that the entire amount of basically reacting metal employed in the reaction mixture is not necessarily reacted with the carbon dioxide and thereby dispersed. All that is required is that some carbon dioxide be reacted with at least a portion of the basically reacting barium compound so that some barium compound is dispersed in the reaction mixture. Unreacted non-dispersed basically reacting barium compound is normally removed from the reaction mixture upon completion by filtration of other convenient means.

The promotor will be present in the reaction mass in an amount such that the ratio of the number of equivalents of promotor to basically reacting barium compound is about 0.05:1 to 1:1 and preferably 0.1:1 to 0.5:1. The number of equivalents for a phenolic promotor depends upon the number of phenolic hydroxy groups present in the molecule. Thus one mole of heptyl phenol contains one equivalent of promotor.

As stated before, an organic diluent is normally employed in a process. Since the diluent is inactive, the amount present is not particularly critical. However, the diluent will ordinarily comprise from about 10 percent to about 90 percent, and preferably 30 to 70 percent, by weight of the reaction mixture based on the total weight of material in the reaction mixture exclusive of the acidic material.

The temperature at which the carbon dioxide is contacted with the initial reaction mixture can vary from about 75°C. to about 300°C. The optimum temperature depends in a large measure upon the promotor employed. With phenolic promoters, the temperature usually ranges from about 80°C. to about 300°C. and preferably from about 100°C. to about 250°C.

The following examples demonstrate the preparation of typical stabilizing agents. It is to be understood that these examples are merely illustrative. Unless otherwise indicated, all percentages and parts express percent by weight and parts by weight.

EXAMPLE 1

A. A reaction mixture comprising 196 parts by weight of mineral oil, 280 parts by weight of a polyisobutenyl (M.W.1000)-substituted succinic anhydride (0.5 equivalents) and 15.4 parts of a commercial mixture of ethylene polyamine having an average composition corresponding to that of tetraethylene pentamine (0.357 equivalents) is mixed over a period of approximately 15 minutes. The reaction mass is then heated to 150°C. over a 5 hour period and subsequently blown with nitrogen at a rate of five parts per hour for 5 hours while maintaining a temperature of 150°–155°C. to remove water. The material is then filtered producing 477 parts of product in oil solution.

B. The procedure of Example 1A is repeated but the amount of amine is increased so that the ratio of equivalents of polyisobutenyl substituted succinic anhydride to ethylene polyamine mixture is 1:1.

C. The procedure of Example 1A is repeated with the amount of amine being increased so that the ratio of equivalents of anhydride to amine is 1:15.

D. The proceudre of Example 1A is repeated except that the ratio of equivalents of anhydride to amine is 1:2.

The following examples demonstrate the process of the invention. The resulting products are the desired barium containing compositions discussed hereinbefore.

Example I

A. To a reaction vessel are added 249 parts mineral oil, 35.6 parts heptylphenol, and 400 parts of a 40 percent oil solution of the acylated nitrogen compound produced according to Example 1A. This mixture is heated to about 148°C. over a 1.5 hour period. Then 139 parts of barium hydroxide monohydrate are added over a 1.1 hour period. Subsequently, carbon dioxide is bubbled through the mixture at a rate of 10 parts per hour for 8 hours while maintaining the temperature of the mass at 150°–160°C. Thereafter, the mass is filtered, the filtrate is characterized by a barium content of 11.7 percent, a nitrogen content of 0.52 percent, and an oil content of 50 percent.

B. The general procedure of Example IA is repeated using 2,618 parts of the oil solution of the product of 1A, 231 parts of heptylphenol, 1,515 parts of barium hydroxide monohydrate, and 3,031 parts of diluent oil. This mixture is blown with carbon dioxide via a submerged line for 2.5 hours at a rate of five parts per hour. The reaction mass is blown with nitrogen for 2 hours while maintaining the temperature of the mass at 165°C. and thereafter filtered. 6,000 parts of the filtrate is recovered. The filtrate is a brown viscous liquid characterized by a varium sulfate ash content of 24 percent, a nitrogen content of 0.39 percent, and an oil content of 54.7 percent.

C. To a three-liter flash equipped with a reflux condenser and container 655 grams of the filtrate of Example 1A, 80 grams of propylene tetramer-substituted phenol, 211 grams of mineral oil, and 18 grams of isooctanol, there is added 184 grams of barium oxide over a 15-minute period while the temperature of the mixture is maintained at 90°–105°C. Then 22 grams of water is added and the temperature of the mixture is elevated to 120°C. This mixture is blown with carbon dioxide at 1 cubic foot per hour for 2 hours while maintaining a temperature of 145°–170°C. Subsequently, the carbonated mass is blown with nitrogen at 2 cubic feet per hour for 1 hour during which the temperature is 145°–155°C. and then filtered. The filtrate is a brown liquid containing 40 percent oil and is characterized by a nitrogen and barium sulfate ash content of 0.56 percent and 23.14 percent, respectively.

D. The general procedure of I(C) is followed utilizing 2,618 grams of the filtrate of Example 1A, 232 grams of heptylphenol, 1,129 grams of barium oxide, 2,725 grams of diluent oil, 144 grams of water, and 100 grams of isooctanol. The reaction mixture is blown with carbon dioxide at 4 cubic feet per hour for 0.5 hour and then blown with nitrogen (to assist in the removal of water) at 2 cubic feet per hour for 1 hour. A filtrate weighing 6,408 grams is obtained. The filtrate contains 51.7 percent diluent oil and is characterized by a barium sulfate ash content of 23.1 percent and a nitrogen content of 0.38 percent.

E. A half-zinc salt half-acylated nitrogen stabilizing agent is prepared as follows: A reaction mixture containing 402 parts mineral oil, 13 parts water, and 560 parts of a polyisobutenyl (M.W.-1,000)-substituted succinic anhydride is heated at 75°–82°C. for 0.5 hour to convert the anhydride to acid. Thereafter, 20.5 parts of zinc oxide is added over a 0.5 hour period while maintaining the temperature at about 80°C. This mixture is then heated at 93°–98°C. for 4 hours under reflux conditions and then at about 120°C. for 0.5 hour.

To the resulting mixture is added 20.6 parts of the commercial amine mixture of Example 1A while maintaining the temperature at about 120°–125°C. Thereafter the mixture is heated for six hours at 150°–155°C., the last 5 hours being accompanied by nitrogen blowing to facilitate water removal. After filtration, 980 parts of fitrate are obtained characterized by a zinc content of 1.63 percent and a nitrogen content of 0.72 percent.

Following the general procedure of Example ID, 4,000 grams of the above filtrate, 231 grams of heptylphenol, 2,287 grams of mineral oil (diluent), 911 grams of barium hydroxide monohydrate are carbonated at a rate of 3 cubic feet per hour, blown with nitrogen for 2.5 hours, and filtered. The filtrate weights 6,885 grams and is characterized by an oil content of 52 percent, a zinc content of 0.92 percent, a nitrogen content of 0.37 percent and a barium content of 8.23 percent.

F. The general procedure of Example IB is repeated by carbonating a mixture of 549 grams of the product of Example 1D, 116 grams of heptylphenol, 455 grams of barium hydroxide monohydrate, and 1,100 grams of oil for 2 hours at 1.5 cubic feet per hour. The carbonated mixture is blown with nitrogen for 1 hour and filtered. The filtrate is a brown liquid characterized as follows: weight — 1974 grams; oil content — 59 percent; nitrogen content — 0.58 percent; $BaSO_4$ ash content — 24.35 percent.

G. A mixture comprising 1,820 grams of a filtrate prepared as an Example 1B having an oil content of 40 percent, 58 grams of heptylphenol, and 300 grams of mineral oil is heated to 70°C. and 249 grams of barium oxide are added. The mixture is then carbonated at a rate of 5 cubic feet of $CO_2$ per hour until the carbonated mixture is slightly acidic. During carbonation the reaction mass is heated to 150°C. The carbonated mixture is filtered. The filtrate contains 41.5 percent oil and is characterized by a barium sulfate ash content of 13.58 percent and a nitrogen content of 1.1 percent.

Obviously, the stabilizing agents of the present invention can be used along or in combination with each other in preparing the metal-containing dispersions. However, these stabilizing agents can be used in conjunction with other known stabilizing agents or peptizing agents as they are denominated in the prior art. These peptizing agents are quite diverse and include the oil-soluble organic acids and the Group I and Group II metal salts thereof such as the petrosulfonic acids, barium petrosulfonate, oleic acid, calcium oleate, the phosphorus acid mixture produced by stream blowing the reaction product of polyisobutylene and $P_2S_5$, and the like. Other peptizing agents are aliphatic amines such as N-octadecyl propylene diamine and the condensation product of such amines with lower aldehydes such as formaldehyde. These and other peptizing agents are well-known in the art and require no further discussion herein.

The barium-containing dispersions of the present invention can be incorporated directly into various lubricating and fuel compositions. The amount to be used depends upon whether the additive is added to a lubricant, a fuel, and the environment under which the lubricant or fuel is to be employed. For example, these barium-containing dispersions can be successfully employed as detergent-dispersant additives for crankcase lubricating oils when employed in an amount sufficient to impart a sulfate ash content to the lubricating oil of 0.01 percent to 20 percent, preferably 0.01 percent to 10 percent by weight. If the lubricating oil is to be used as a crankcase lubricant for gasoline engines, it normally will contain up to about 1 percent ash. On the other hand for diesel engines, sufficient additive should be used to provide the lubricant with an ash content of up to about 2–5 percent ash while marine diesels may require enough additive to provide an ash content of 10 percent or more.

When the barium-containing dispersions are added to fuels as anti-screenclogging agents, they will normally be employed in amounts such that the ash content of the fuel will be from about 0.001 to about 0.05 percent. If, however, the additive is used in a diesel fuel to suppress the formation of black exhaust smoke upon combustion of the fuel in a diesel engine, enough additive should be employed to impart a sulfate ash content to the diesel fuel of about 0.01 to about 1 percent preferably 0.01 to 0.5 percent.

The barium-containing dispersions of the present invention can be used along or in combination with other fuel and lubricating additives known in the prior art. These additives include for example, other detergents of the ash-containing type, ashless dispersants, viscosity index improving agents, pour point depressing agents, anti-foam agents, extreme pressure agents, rust inhibiting agents, and oxidation and corrosion inhibitors.

The ash-containing detergents are the well known neutral and basic alkali or alkaline earth metal salts of sulfonic acids, carboxylic acids, or organic phosphorus containing acids. These latter are characterized by at least one direct carbon-to-phosphorus linkage. Such acids can be prepared by the steam-treating an olefin polymer e.g., polyisobutene having a molecular weight of 1,000, with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are the sodium, potassium lithium, calcium, magnesium, strontium, and barium salts. The calcium and barium salts are used more extensively then the others. The "basic salts" are those metal salts known in the art wherein the metal is present in a stoichiometrically larger amount than that necessary to neutralize the acid. The calcium and the barium overbased petrosulfonic acids are typical examples of such basic salts.

The ashless dispersants are also a well known class of materials used as additives for lubricating oils and fuels. They are particularly effective as dispersants at lower temperatures. The stabilizing agents of the present invention are representative of these dispersants.

Extreme pressure agents, corrosion inhibiting agents, and oxidation-inhibiting agents are exemplified by chlorinated aliphatic hydrocarbons such as chlorinated wax; organic sulfides and polysulfides such as benzyldisulfide, bis-(chlorobenzyl)disulfide, dibutyltetrasulfide, sulfurized sperm oil, sulfurized methyl ester of oleic acid, sulfurized alkylphenol, sulfurized dipentene, and sulfurized terpene, sulfurized Diels-Alder adducts such as sulfurized adduct of butadiene and butylacrylate; phosphosulfurized hydrocarbons such as the reaction product of a phosphorus sulfide with terpentine or methyl oleate; phosphorus esters such as the dihydrocarbon and trihydrocarbon phosphites, e.g., dibutylphosphite diheptylphosphite, dicyclohexylphosphite, pentylphenylphosphite, dipentylphenylphosphite, tridecylphosphite, distearylphosphite, and polypropylene (molecular weight 500)- substituted phenylphosphite; metal thiocarbonates exemplified by zinc dioctyldithiocarbonate and barium heptylphenyldi-thiocarbonate; Group II metal salts of phosphorodithioic acids such as zinc dicyclohexylphosphorodithioate, zinc dioctylphosphorodithioate, barium di(heptylphenyl) phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

These additional additives are well known to those skilled in the art and the foregoing listing is merely to illustrate the types of additional additives which can be present in the lubricating and fuel compositions in which the metal-containing dispersions of the present invention are employed. A brief survey of additives for lubricating compositions is contained in *LUBRICANT ADDITIVES*, C. V. Smalheer and R. Kennedy Smith, published by The Lezius-Hiles Company, Cleveland, Ohio, 1967.

When additional additives are present, they will normally be employed in amounts such that they comprise from about 0.001 percent to about 20 percent by weight of the total composition. For example additional ashless dispersants can be employed in amounts of from about 0.1 percent to about 10 percent while additional metal-containing detergents will be present in amounts of from about 0.1 percent to about 20 percent by weight. Since the present barium-containing dispersions contain a dispersant, it will be obvious to those skilled in the art that the present compositions can be substituted in known lubricating compositions in such a manner that the barium-containing dispersions replaces all or a portion of the metal and the stabilizing agents replaces all or a portion of the ashless dispersants in the known compositions. Pour point depressants, extreme pressure additives, viscosity index improving agents, and anti-foaming agents, and the like are normally employed in amounts up to about 0.001 percent to about 10 percent by weight of the total composition depending on the nature and purpose of the particular additive.

The following compositions exemplify typical useful embodiments of the metal-containing dispersions of the present invention.

COMPOSITION A

SAE 10W-30 mineral lubricating oil containing 3 percent of the product of Example I(C), 0.06 percent of phosphorus as zinc di-n-octylphosphorodithioate, and 0.2 percent sulfate ash as basic barium mahogany sulfonate.

COMPOSITION B

SAE 30 mineral lubricating oil containing 6 percent of the filtrate of Example IA.

COMPOSITION C

SAE 80 mineral lubricating oil containing 1 percent of the reaction product of polyisobutenyl-substituted succinic anhydride and tetraethylene pentamine reacted in an equivalent ratio of 1:1, percent of the product of Example IA, 0.1 percent phosphorus as zinc di-n-hexylphosphorodithioate, 10 percent of a chlorinated paraffin wax having a chlorine content of 40 percent, 2 percent of dibyltetrasulfide, 2 percent of sulfurized dipentene, 0.2 percent of oleyl amide, 0.003 percent of an anti-foam agent, 0.3 percent of a pour point depressant and 3 percent of a viscosity index improver.

COMPOSITION D

Diesel fuel containing 0.15 percent barium sulfate ash from the product of Example IA.

COMPOSITION E

Kerosene containing 0.01 percent sulfate ash of the product of Example IA.

While the foregoing generally refers to the use of the barium-containing dispersions in mineral lubricating oils or petroleum distillate fuels, it should be understood that the present invention is not limited to use in mineral oil-based lubricating compositions. Other lubricating oils, natural as well as synthetic can be used as the base of the lubricating oil and grease compositions contemplated by the present invention. Such natural and synthetic bases include hydrocarbon oils produced from alkylene oxides such as polyethylene oxide and polypropylene oxide polymers or the esters and ethers thereof. The synthetic ester oils such as those produced from polycarboxylic acids and alcohols including glycols and polyglycols are also contemplated as being without the scope of the invention. Examples of these oils are dibutyl adipate, di-(2-ethylhexyl) sebacate, dilauryl azelate, etc.

What is or is:

1. The process comprising carbonating at a temperature of from about 75°C. to about 300°C. at least one basically reacting barium compound selected from the class consisting of barium oxide, barium hydroxide, and barium lower alkoxide in the presence of (a) an alkylated phenol selected from the group consisting of mono- and dialkylated phenols where the alkyl groups contain from six to twenty carbon atoms, (b) a stabilizing agent which is the reaction product produced by reacting at a temperature within the range of about 100°C to about 250°C. at least one acid-producing compound selected from the class consisting of substantially saturated hydrocarbon-substituted succinic acid and anhydride wherein the substantially saturated hydrocarbon substituent contains at least about fifty aliphatic carbon atoms, with an ethylene polyamine wherein the ratio of acid-producing compound to the ethylene polyamine is from about one equivalent of acid-producing compound to about 0.5 equivalents to 2 moles of ethylene polyamine; wherein the ratio of equivalents of stabilizing agent to equivalents of basically reacting barium compound is about 1:0.5 to about 1:12, the ratio of equivalents of carbon dioxide to equivalents of basically reacting barium metal compound is about 1:1 to about 1:10, and the ratio of equivalents of alkylated phenol to basically reacting barium compound is about 0.1:1 to about 0.5:1.

2. A barium-containing dispersion produced according to the process of claim 1.

3. A lubricant of fuel comprising a major amount of a lubricating oil or petroleum distillate fuel, respectively, and a minor amount of barium-containing dispersion according to claim 2.

* * * * *